United States Patent
Mafune et al.

(10) Patent No.: US 7,198,664 B2
(45) Date of Patent: Apr. 3, 2007

(54) INK JET BLACK INK, INK SET, INK JET RECORDING METHOD, INK CARTRIDGE, RECORDING UNIT, AND INK JET RECORDING APPARATUS

(75) Inventors: Kumiko Mafune, Kawasaki (JP); Hideki Takayama, Fujisawa (JP); Daiji Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/339,770

(22) Filed: Jan. 26, 2006

(65) Prior Publication Data

US 2006/0119684 A1   Jun. 8, 2006

Related U.S. Application Data

(63) Continuation of application No. PCT/JP05/14241, filed on Jul. 28, 2005.

(30) Foreign Application Priority Data

Jul. 29, 2004  (JP) ............................. 2004-221833
Jul. 26, 2005  (JP) ............................. 2005-216231

(51) Int. Cl.
   *C09D 11/02* (2006.01)
   *B41J 2/01* (2006.01)
(52) U.S. Cl. ............................... 106/31.28; 106/31.52; 347/100
(58) Field of Classification Search ............ 106/31.28, 106/31.52; 347/100
   See application file for complete search history.

(56) References Cited

U.S. PATENT DOCUMENTS

| | | | |
|---|---|---|---|
| 3,969,339 A * | 7/1976 | Sailer et al. ................. 534/743 |
| 4,202,870 A | 5/1980 | Weber et al. ................. 423/630 |
| 4,242,271 A | 12/1980 | Weber et al. ................ 260/448 |
| 4,295,889 A * | 10/1981 | Eida et al. ................ 106/31.52 |
| 4,391,960 A | 7/1983 | Kleine et al. .................. 526/74 |
| 4,395,288 A * | 7/1983 | Eida et al. ................ 106/31.51 |
| 4,426,226 A * | 1/1984 | Ohta et al. ................ 106/31.51 |
| 4,535,044 A * | 8/1985 | Higashiguchi et al. ...... 430/59.3 |
| 4,723,129 A | 2/1988 | Endo et al. ................... 346/1.1 |
| 4,740,796 A | 4/1988 | Endo et al. ................... 346/1.1 |
| 5,078,790 A | 1/1992 | Tochihara et al. ............. 106/20 |
| 5,080,716 A | 1/1992 | Aoki et al. ..................... 106/20 |
| 5,092,926 A * | 3/1992 | Owatari .................... 106/31.51 |
| 5,127,946 A | 7/1992 | Eida et al. ...................... 106/22 |
| 5,131,949 A | 7/1992 | Tochihara et al. ............. 106/20 |
| 5,132,700 A | 7/1992 | Tochihara et al. ............. 346/1.1 |
| 5,213,613 A | 5/1993 | Nagashima et al. ....... 106/20 R |
| 5,215,577 A | 6/1993 | Eida et al. ...................... 106/22 |
| 5,258,066 A | 11/1993 | Kobayashi et al. ........ 106/22 R |
| 5,296,022 A | 3/1994 | Kobayashi et al. ............ 106/20 |
| 5,451,251 A | 9/1995 | Mafune et al. ............. 106/22 H |
| 5,466,282 A | 11/1995 | Eida et al. ................. 106/22 K |
| 5,530,105 A * | 6/1996 | Yamazaki et al. ........ 106/31.49 |
| 5,571,313 A | 11/1996 | Mafune et al. ............. 106/22 H |
| 5,936,649 A | 8/1999 | Ikeda et al. ..................... 347/87 |
| 6,342,096 B1 | 1/2002 | Kurabayashi ............. 106/31.27 |
| 6,367,921 B1 | 4/2002 | Kurabayashi et al. ........ 347/101 |
| 6,412,936 B1 | 7/2002 | Mafune et al. ............... 347/100 |
| 6,460,988 B1 | 10/2002 | Mafune et al. ............... 347/100 |
| 6,471,757 B1 | 10/2002 | Koitabashi et al. ....... 106/31.28 |
| 6,698,876 B2 | 3/2004 | Sato et al. .................... 347/100 |
| 6,702,882 B2 | 3/2004 | Yakushigawa et al. .. 106/31.27 |
| 6,706,100 B2 | 3/2004 | Mafune et al. ........... 106/31.27 |
| 6,706,104 B2 | 3/2004 | Takuhara et al. ............ 106/31.6 |
| 6,843,839 B2 | 1/2005 | Kanke et al. .............. 106/31.47 |
| 6,848,781 B2 | 2/2005 | Ogino et al. ................. 347/105 |
| 6,866,380 B2 | 3/2005 | Yakushigawa et al. ..... 347/100 |
| 6,874,881 B2 | 4/2005 | Suzuki et al. ................ 347/100 |
| 7,029,109 B2 | 4/2006 | Shirota et al. ............... 347/100 |
| 7,055,943 B2 | 6/2006 | Suzuki et al. ................ 347/100 |
| 2002/0039130 A1 | 4/2002 | Koitabashi .................... 347/100 |
| 2004/0074418 A1 | 4/2004 | Mafune et al. ........... 106/31.27 |
| 2005/0005818 A1 | 1/2005 | Sato et al. ................. 106/31.27 |
| 2005/0007436 A1 | 1/2005 | Ogino et al. ................. 347/105 |
| 2006/0098067 A1 | 5/2006 | Imai et al. .................... 347/100 |
| 2006/0102046 A1 | 5/2006 | Okamura et al. ......... 106/31.47 |
| 2006/0102047 A1 | 5/2006 | Yoshizawa et al. ....... 106/31.47 |
| 2006/0102048 A1* | 5/2006 | Nakamura et al. ........ 106/31.52 |
| 2006/0119682 A1 | 6/2006 | Okamura et al. ............ 347/100 |
| 2006/0119684 A1 | 6/2006 | Mafune et al. ............... 347/100 |
| 2006/0137569 A1* | 6/2006 | Osumi et al. .............. 106/31.13 |

| | | | |
|---|---|---|---|
| 2006/0146108 | A1* | 7/2006 | Sato et al. ............... 347/100 |
| 2006/0152569 | A1 | 7/2006 | Junnou et al. ............ 347/105 |
| 2006/0156952 | A1* | 7/2006 | Takayama et al. ....... 106/31.52 |

FOREIGN PATENT DOCUMENTS

| | | |
|---|---|---|
| EP | 1602695 * | 12/2005 |
| JP | 57-44605 | 3/1982 |
| JP | 07-68480 | 3/1995 |
| JP | 07-68481 | 3/1995 |
| JP | 07-68482 | 3/1995 |
| JP | 08-26263 | 1/1996 |
| JP | 10-204308 | 8/1998 |
| JP | 02919615 | 4/1999 |
| JP | 11-240145 | 9/1999 |
| JP | 11-286126 | 10/1999 |
| JP | 2000-290552 | 10/2000 |
| JP | 2000-318300 | 11/2000 |
| JP | 2002-275380 | 9/2002 |
| JP | 2003-292808 | 10/2003 |
| JP | 2004/078860 | 9/2004 |
| JP | 2004-285351 | 10/2004 |
| JP | 2005-36164 | 2/2005 |
| JP | 2005-36222 | 2/2005 |
| JP | 2005-68416 | 3/2005 |

OTHER PUBLICATIONS

RN554433-03-3 Registry, copyright 2006 ACS on STN.
RN546079-42-9 Registry, copyright 2006 ACS on STN.

\* cited by examiner

*Primary Examiner*—Helene Klemanski
(74) *Attorney, Agent, or Firm*—Ftizpatrick, Cella, Harper & Scinto

(57) ABSTRACT

An object of the present invention is to provide an ink jet black ink by which an image quality comparable to that of a silver halide photograph is obtained with a compatibility between a high fastness and a high image quality when the ink is printed on a recording medium, and which is excellent in optical density and color tone particularly in half tone, and is also excellent in gas resistance. The present invention provides an ink jet black ink comprising a dye and a black pigment, wherein the dye is at least one kind selected from the group consisting of compounds represented by the following formula (I) or salts thereof, and compounds represented by the following formula (II) or salts thereof General formula (I)

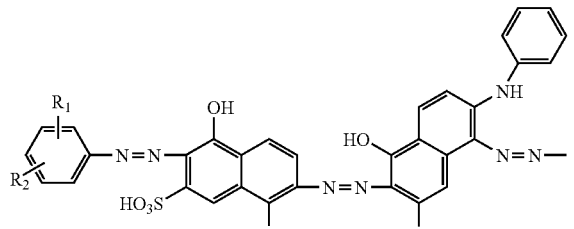

General formula (II)

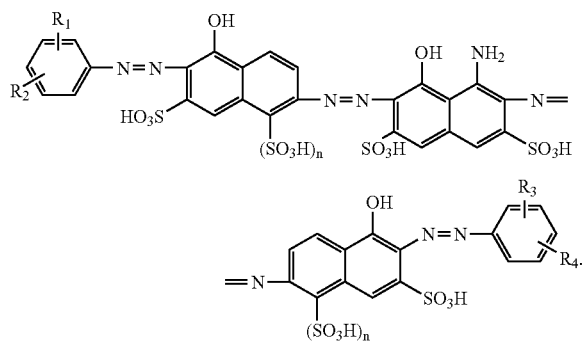

9 Claims, 6 Drawing Sheets

INK JET BLACK INK, INK SET, INK JET RECORDING METHOD, INK CARTRIDGE, RECORDING UNIT, AND INK JET RECORDING APPARATUS

This application is a continuation of International Application No. PCT/JP2005/014241 filed on Jul. 28, 2005, which claims the benefit of Japanese Patent Application No. 2004-221833 filed on Jul. 29, 2004, and No. 2005-216231 filed on Jul. 26, 2005.

BACKGROUND OF THE INVENTION

1. Field of the Invention

The present invention relates to an ink, particularly an ink jet black ink that performs recording on a recording medium by being ejected from an orifice in accordance with a recording signal and can be used suitably for ink jet recording, an ink set, an ink jet recording method, an ink cartridge, a recording unit, and an ink jet recording apparatus.

2. Related Background Art

An ink jet recording method is coming to be widely used particularly in an office or for personal use as means for easily forming color images. In recent years, images recorded by ink jet recording has a higher image quality, so that it is possible to realize recorded images having a high image quality even comparable to that of a silver halide photograph. For this reason, there are requests for performance such as excellency in color tone reproducibility, product quality performance on the recorded images such as giving images with high optical density and a vivid color tone, and further a long-term storage property of the images. The long-term storage property is namely an image fastness such as a property that the images do not undergo color change or color degradation due to sunlight or various illuminations (light resistance), or that the images do not undergo color change or color degradation by oxidizing gas (ozone, $NO_x$, $SO_x$, or the like) contained in a slight amount in environmental atmosphere (gas resistance).

Also, in recent years, as a recording medium for ink jet, a recording medium is used in which a porous material such as alumina or silica is used in an ink receiving material so as to obtain an image quality comparable to or surpassing that of a silver halide photograph. In particular, a recording medium that uses alumina hydrate has advantages in that, because alumina hydrate has a positive electric charge, the coloring material having a negative electric charge in ink is fixed well to give an image with good color generation, and that the recording medium is preferable when compared with a conventional recording medium particularly in terms of image quality and gloss in full-color images.

Regarding the above-described fastness, the aforesaid recording medium may in some cases exhibit a considerable color change or degradation in terms of gas resistance, so that an improvement is desired.

Also, regarding black ink, the following are particularly desired in terms of image performance and fastness.

First, with regard to the image performance, it is desired to enhance the optical density and make the color tone be near to the neutral, so that various proposals have been made. For example, a technique with an ink using specific two kinds of dyes is shown (For example, see Japanese Patent Application Laid-open No. 2000-290552). Also, a technique is disclosed in which, after a treating agent containing a polymer substance is applied to a recording medium, an ink containing a coloring material is made to adhere to the recording medium to aggregate the coloring material, thereby improving the OD (optical density) as a result (For example, see Japanese Patent Application Laid-open No. 2000-318300). Also, as a dye that exhibits a high optical density, an ink that uses a novel dis-azo or tris-azo dye is disclosed (For example, see Japanese Patent Application Laid-open No. 2002-275380 and Japanese Patent Application Laid-open No. 2003-292808).

Next, with regard to the fastness, there is a proposal to improve the color tone and the color change resistance against ozone gas (For example, see Japanese Patent No. 02919615 and Japanese Patent Application Publication No. H08-26263). However, in the ink jet recording method of recent years that can give recorded images of high image quality comparable to that of a silver halide photograph, a further improvement of gas resistance is desired. Above all, the fastness tends to become more aggravated in images that are a little sparse, i.e. in a half tone, than in images having a large amount of applied ink, so that the degradation of fastness is conspicuous in recorded objects. Therefore, it is extremely important to maintain the fastness to be good even in a part having a small amount of applied ink.

From the past, it is generally known that a pigment is superior to a dye in terms of fastness, so that many proposals of an ink using a pigment have been made. When a pigment ink is used, the fastness is good when printed on an ordinary paper sheet or on a recording medium of a so-called swelling type that is provided with a resin of swelling type in an ink receiving layer. However, when the ink is printed on a recording medium of a so-called absorbing type that is provided with a porous material in an ink receiving layer, the pigment does not permeate into the inside of the recording medium and is aggregated on the recording medium because the pore of the porous material is small as compared with the particle size of the pigment in the ink. This generates a metal luster (bronze) and may in some cases lead to decrease in the optical density.

With regard to an ink that uses a pigment, a combined use of a pigment and a dye is proposed (For example, see Japanese Patent Application Publication Nos. H07-68480, H07-68481, H07-68482, Japanese Patent Application Laid-open Nos. H11-240145 and H11-286126). However, these proposals aim at making improvements with respect to an ordinary paper sheet or a recording medium having a resin layer as a coating layer.

SUMMARY OF THE INVENTION

As has been described so far, there has conventionally been no disclosure of a technique that achieves compatibility between the fastness and the optical density on any recording medium by using a dye and a pigment in combination.

The inventors of the present invention have made repeated studies in view of the above object and, in that process, made an evaluation of various dyes and pigments. As a result, the inventors have found out a combination of a dye and a pigment that achieves compatibility between a high fastness and a high image quality, thereby making the present invention.

Therefore, an object of the present invention is to provide an ink jet black ink by which an image quality comparable to that of a silver halide photograph is obtained with a compatibility between a high fastness and a high image quality when the ink is printed on a recording medium.

Another object of the present invention is to provide an ink jet black ink which is excellent in optical density and color tone particularly in half tone, and is also excellent in gas resistance when the ink is printed on a recording medium (in particular, when the ink is printed on a recording medium provided with a porous material having a cationic electric charge for receiving the ink on a supporting material).

Another object of the present invention is to provide an ink jet black ink that can restrain generation of a metal luster (bronze) when the ink is printed on a recording medium of a so-called absorbing type that is provided with a porous material in an ink receiving layer.

Further, another object of the present invention is to provide an ink set, an ink jet recording method, an ink cartridge, a recording unit, and an ink jet recording apparatus that use the aforesaid ink jet black ink.

The above objects are achieved by the present invention described below. That is, according to one aspect of the present invention, an ink jet black ink is provided comprising a dye and a black pigment, wherein the dye is at least one kind selected from the group consisting of compounds represented by the following formula (I) or salts thereof, and compounds represented by the following formula (II) or salts thereof;

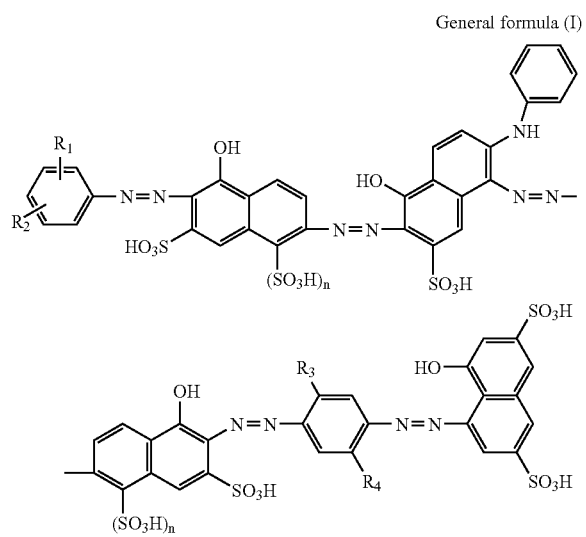

General formula (I)

wherein $R_1$ and $R_2$ each independently represent a hydrogen atom, a hydroxyl group, an amino group, a carboxyl group, a sulfonic group, an alkyl group having 1 to 4 carbon atoms or an alkoxy group having 1 to 4 carbon atoms; and $R_3$ and $R_4$ each independently represent a hydrogen atom, an alkyl group having 1 to 4 carbon atoms, an alkoxy group having 1 to 4 carbon atoms, a hydroxyl group, an alkyl group having 1 to 4 carbon atoms which may be substituted with a hydroxyl group or with an alkoxy group having 1 to 4 carbon atoms, an alkoxy group having 1 to 4 carbon atoms and which may be substituted with a hydroxyl group, with an alkoxy group having 1 to 4 carbon atoms, with a sulfonic group, or with a carboxyl group, or an amino group which is substituted with an alkyl group or with an acyl group; and n represents 0 or 1; and

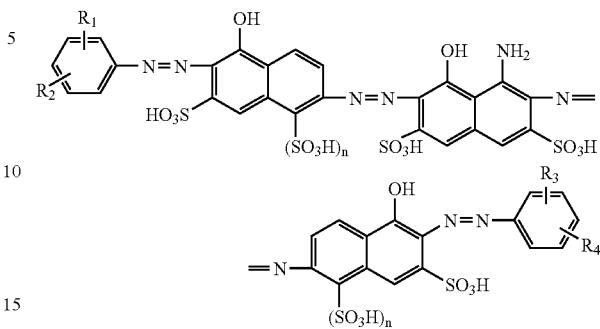

General formula (II)

wherein $R_1$, $R_2$, $R_3$, and $R_4$ each independently represent a hydrogen atom, a hydroxyl group, an amino group, a carboxyl group, a sulfonic group, an alkyl group having 1 to 4 carbon atoms, an alkoxy group having 1 to 4 carbon atoms, an alkoxy group substituted with a hydroxyl group, an alkoxy group having 1 to 4 carbon atoms, a sulfonic group or a carboxyl group, an alkoxy group having 1 to 4 carbon atoms and which may be further substituted with a carboxyl group or with a sulfonic group, or an amino group substituted with a phenyl group, with an alkyl group, or with an acyl group; and n represents 0 or 1.

Further, according to another aspect of the present invention, an ink jet black ink is provided having the above-mentioned construction, wherein the black pigment is a self-dispersion carbon black.

Further, according to another aspect of the present invention, an ink jet black ink is provided having the above-mentioned construction, wherein a mass ratio of the content of the dye to the content of the pigment satisfies (content of dye/content of pigment) >5.

Further, according to another aspect of the present invention, an ink set is provided comprising a plurality of inks, which comprises the ink jet black ink having the above-mentioned construction as a black ink.

Further, according to another aspect of the present invention, an ink jet recording method is provided comprising ejecting an ink by ink jet method, wherein the ink comprises the ink jet black ink having the above-mentioned construction.

Further, according to another aspect of the present invention, an ink cartridge is provided comprising an ink storage portion for storing an ink, wherein the ink comprises the ink jet black ink having the above-mentioned construction.

Further, according to another aspect of the present invention, a recording unit is provided comprising an ink storage portion for storing an ink and a recording head for ejecting the ink, wherein the ink comprises the ink jet black ink having the above-mentioned construction.

Further, according to another aspect of the present invention, an ink jet recording apparatus is provided comprising an ink storage portion for storing an ink and a recording head for ejecting the ink, wherein the ink comprises the ink jet black ink having the above-mentioned construction.

Further, according to another aspect of the present invention, an ink jet black ink is provided comprising at least one kind of a dye and at least one kind of a black pigment, wherein the dye has four or more azo groups in a molecule, and the sum of the number of sulfonic groups that the molecule has at ortho positions relative to the azo groups is four or more.

The present invention can provide an ink jet black ink by which an image quality comparable to that of a silver halide photograph is obtained with a compatibility between a high fastness and a high image quality when the ink is printed on a recording medium.

Another embodiment of the present invention can provide an ink jet black ink which is excellent in optical density and color tone particularly in half tone, and is also excellent in gas resistance when the ink is printed on a recording medium (in particular, when the ink is printed on a recording medium provided with a porous material having a cationic electric charge for receiving the ink on a supporting material).

Another embodiment of the present invention can provide an ink jet black ink that can restrain generation of a metal luster (bronze) when the ink is printed on a recording medium of a so-called absorbing type that is provided with a porous material in an ink receiving layer.

Further, another embodiment of the present invention can provide an ink set, an ink jet recording method, an ink cartridge, a recording unit, and an ink jet recording apparatus that use the aforesaid ink jet black ink.

DETAILED DESCRIPTION OF THE PREFERRED EMBODIMENTS

Figure 1:
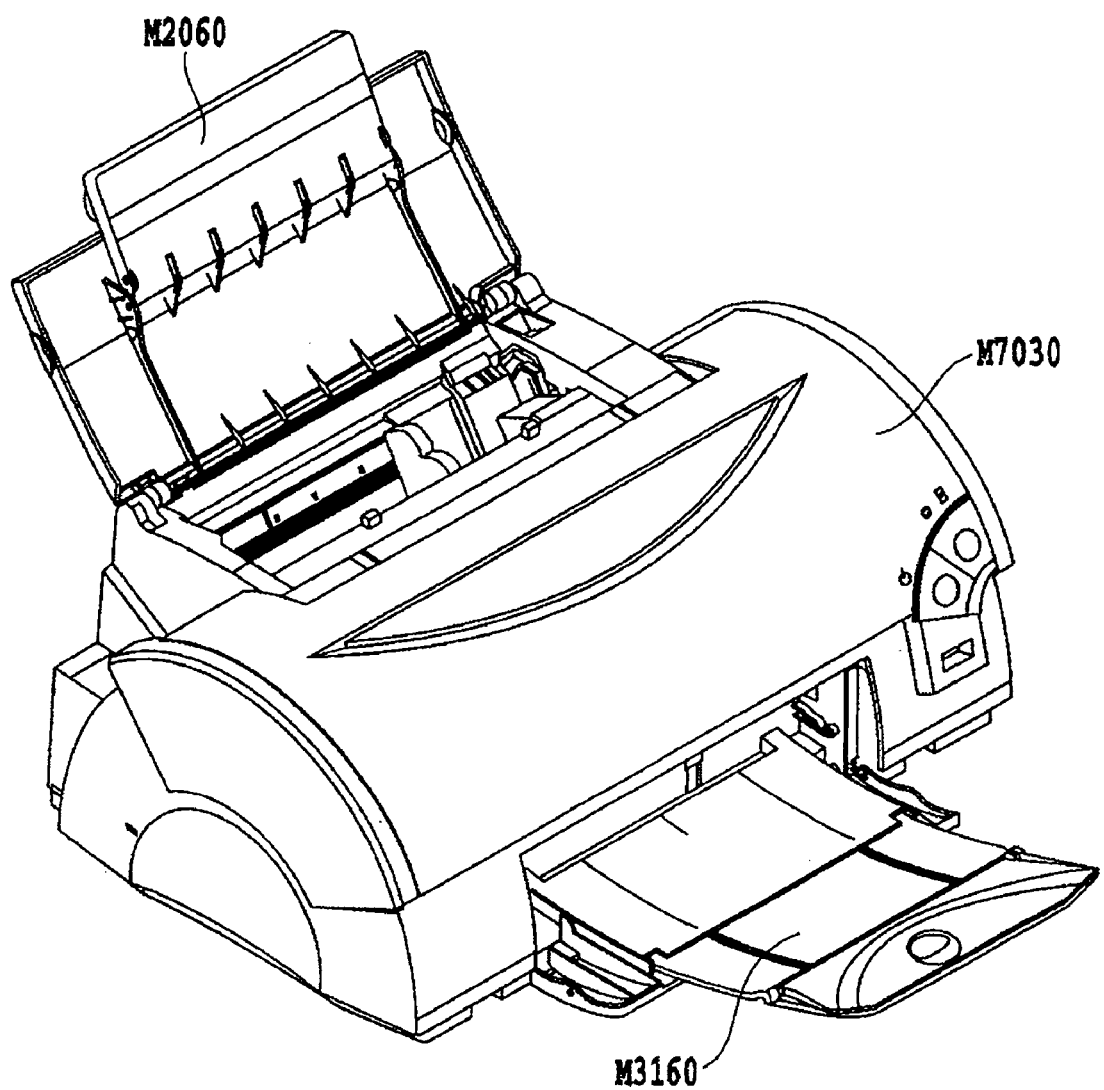
FIG. 1 is a perspective view of a recording apparatus.

Hereafter, the present invention will be described further in detail with a preferable embodiment.

In the present invention, when a compound is a salt, the salt is dissociated into ions in ink, but this state is represented by using the phrase "contains a salt" for convenience.

<Ink>

Hereafter, the components and others constituting an ink jet black ink (which may hereafter be simply referred to as ink) according to the present invention will be described in detail.

[Coloring Materials]

The coloring materials used in the ink of the present invention are at least one kind of a dye selected from the group consisting of compounds represented by the following formula (I) or salts thereof and compounds represented by the following formula (II) or salts thereof, and at least one kind of a black pigment.

(Dye)

The dye used in the ink of the present invention is at least one kind selected from the group consisting of compounds represented by the following formula (I) or salts thereof, and compounds represented by the following formula (II) or salts thereof.

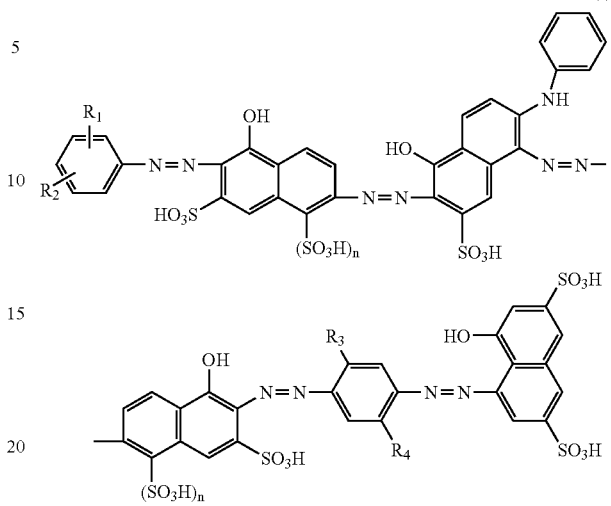

General formula (I)

(In the general formula (I), $R_1$ and $R_2$ each independently represent a hydrogen atom, a hydroxyl group, an amino group, a carboxyl group, a sulfonic group, an alkyl group having 1 to 4 carbon atoms or an alkoxy group having 1 to 4 carbon atoms; and $R_3$ and $R_4$ each independently represent a hydrogen atom, an alkyl group having 1 to 4 carbon atoms, an alkoxy group having 1 to 4 carbon atoms, a hydroxyl group, an alkyl group having 1 to 4 carbon atoms which may be substituted with a hydroxyl group or with an alkoxy group having 1 to 4 carbon atoms, an alkoxy group having 1 to 4 carbon atoms and which may be substituted with a hydroxyl group, with an alkoxy group having 1 to 4 carbon atoms, with a sulfonic group, or with a carboxyl group, or an amino group which is substituted with an alkyl group or with an acyl group; and n represents 0 or 1.)

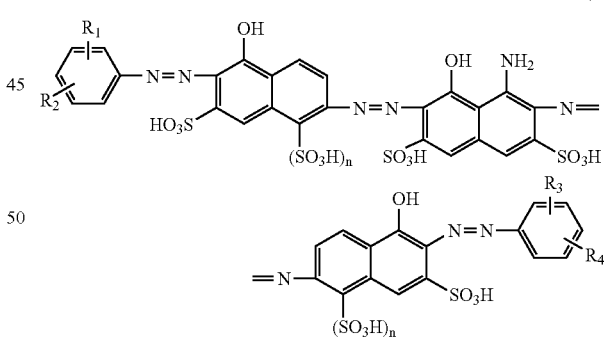

General formula (II)

(In the general formula (II), $R_1$, $R_2$, $R_3$, and $R_4$ each independently represent a hydrogen atom, a hydroxyl group, an amino group, a carboxyl group, a sulfonic group, an alkyl group having 1 to 4 carbon atoms, an alkoxy group having 1 to 4 carbon atoms, an alkoxy group substituted with a hydroxyl group, an alkoxy group having 1 to 4 carbon atoms, a sulfonic group or a carboxyl group, an alkoxy group having 1 to 4 carbon atoms and which may be further substituted with a carboxyl group or with a sulfonic group, or an amino group substituted with a phenyl group, with an alkyl group, or with an acyl group; and n represents 0 or 1.)

Hereafter, exemplified compounds 1 to 3 will be shown as specific examples of the compounds represented by the general formula (I) or salts thereof, and exemplified compounds 4 to 6 will be shown as specific examples of the compounds represented by the general formula (II) or salts thereof. It goes without saying that the dye used in the present invention is not limited to these alone. Also, two or more kinds of dyes can be used at the same time.

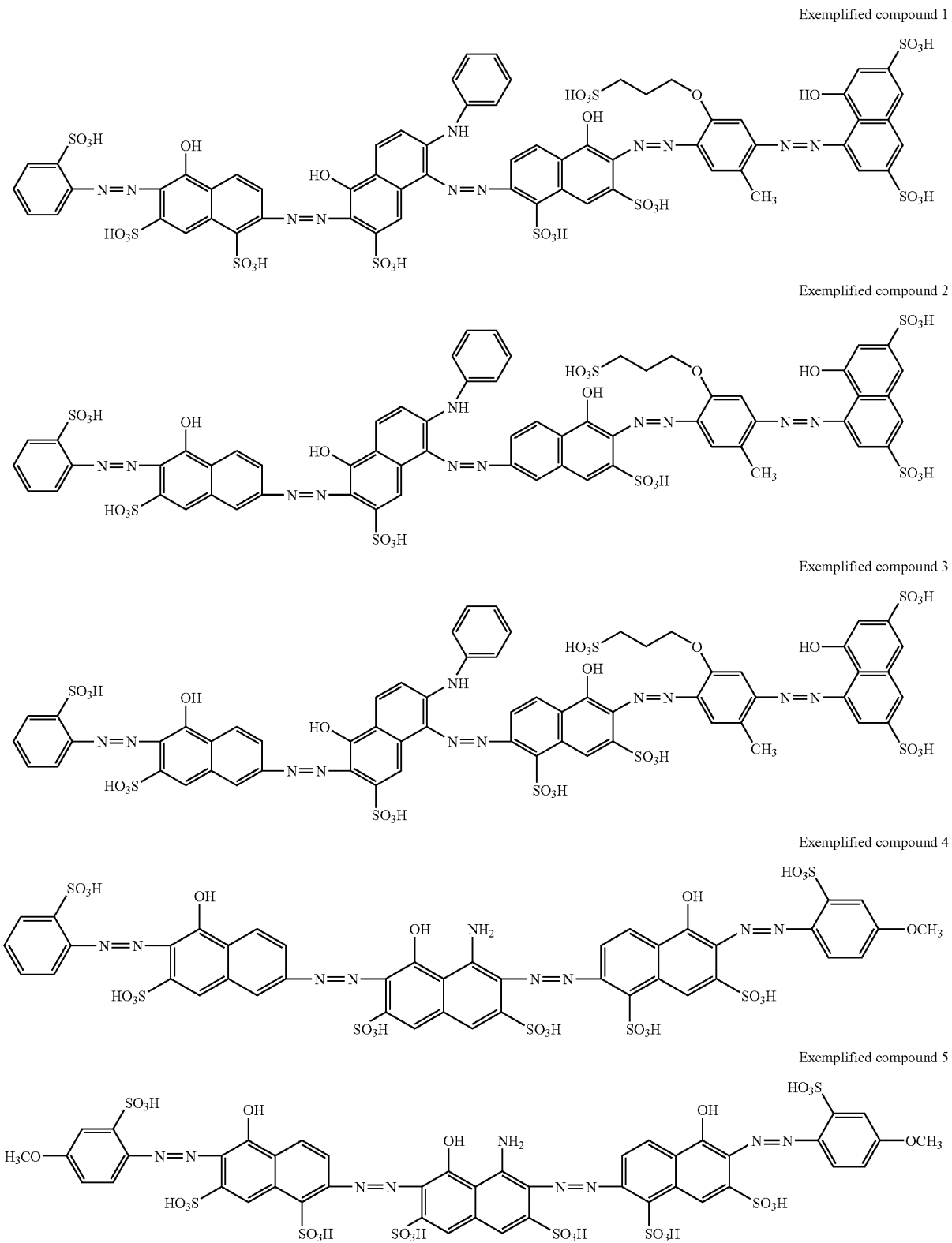

-continued

Exemplified compound 6

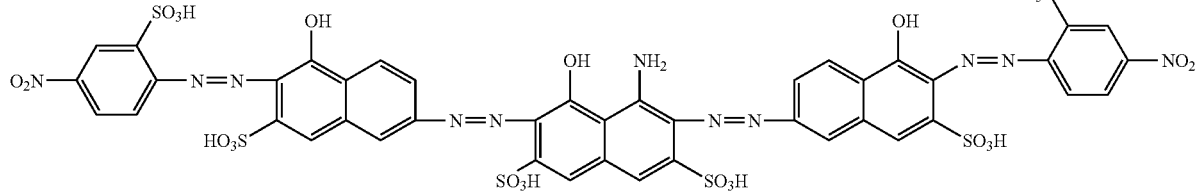

The sum of the content of the compounds represented by the following formula (I) or salts thereof, and the compounds represented by the following formula (II) or salts thereof in the ink of the present invention is preferably 1.0 mass % or more and 15.0 mass % or less, particularly 3.0 mass % or more and 10.0 mass % or less, with respect to the total mass of the ink. When the sum of the content is below 1.0 mass %, the color developability may be insufficient when the ink is printed on a recording medium provided with a porous material having a cationic electric charge on a supporting material. When the sum of the content exceeds 15.0 mass %, a good ink jet property may not be obtained, for example, a sticking recovery property (performance that the ink is recovered by a recovery operation such as purging when the ink sticks to the recording head) may not be obtained.

Also, the mass ratio of the content of the compounds represented by the following formula (I) or salts thereof to the content of the compounds represented by the following formula (II) or salts thereof in the ink of the present invention (content of general formula (I): content of general formula (II)) is preferably 1:9 to 9:1. Within the above range, an especially excellent color tone can be obtained with the ink.

[Method of Testing the Dye]

The dye used in the present invention can be tested by the following methods (1) to (3) each of which involves the use of high performance liquid chromatography (HPLC).
(1) Retention time of the peak
(2) Maximum absorption wavelength in the peak of (1)
(3) M/Z (posi, nega) of mass spectrum in the peak of (1)

Analysis conditions for high performance liquid chromatography are as shown below. An ink solution diluted 1,000 times with pure water is analyzed by means of high performance liquid chromatography under the following conditions to measure the retention time of a peak and the maximum absorption wavelength of a peak.

Column: Symmetry C18 2.1 mm×150 mm
Column temperature: 40° C.
Flow rate: 0.2 ml/min
PDA: 210 nm to 700 nm
Mobile phase and gradient condition: Table 1

TABLE 1

|  | 0–5 min | 5–40 min | 40–45 min |
|---|---|---|---|
| A water | 85% | 85%→0% | 0% |
| B methanol | 10% | 10%→95% | 95% |
| C 0.2 mol/l aqueous solution of ammonium acetate | 5% | 5% | 5% |

In addition, analysis conditions for a mass spectrum are as shown below. The mass spectrum of the resultant peak is measured under the following conditions, and the most strongly detected M/Z respectively for posi and nega is measured.

| Ionization method | | |
|---|---|---|
| ESI | Capillary voltage | 3.1 kV |
|  | Desolvating gas | 300° C. |
|  | Ion source temperature | 120° C. |
| Detector | posi | 40 V 500–2,000 amu/0.9 sec |
|  | nega | 40 V 200–1500 amu/0.9 sec |

Table 2 shows the values of the retention time, the maximum absorption wavelength, M/Z (posi), and M/Z (nega) of the exemplified compound 1 and the exemplified compound 4. When a compound has values shown in Table 2, the compound can be judged to the compounds used in the present invention.

TABLE 2

|  | Retention time [min] | Maximum absorption wavelength [nm] | M/Z | |
|---|---|---|---|---|
|  |  |  | Posi | Nega |
| Exemplified compound 1 | 25–27 | 565–585 | 833–834 | 554–555 |
| Exemplified compound 4 | 15–17 | 645–665 | 1315–1316 | 172–173 |

(Black Pigment)

In the ink according to the present invention, it is essential to use a black pigment together with the above-described dye. The aforesaid black pigment is preferably a self-dispersion carbon black.

As a specific example of self-dispersion carbon black, a carbon black having at least one hydrophilic group bonded directly or via another atomic group to the carbon black surface can be cited. In particular, a self-dispersion carbon black having an ionic property is preferable. Introduction of a hydrophilic group to the carbon black surface, as a result, eliminates the need for a dispersant for dispersing carbon black as in the case of a conventional ink.

As a carbon black electrically charged to be anionic, those having a hydrophilic group such as —COOM, —SO$_3$M, —PO$_3$M, or —PO$_3$M$_2$ bonded to the carbon black surface can be cited (in the formula, M is a hydrogen atom, an alkali metal, an ammonium, or an organic ammonium). Particularly among these, a carbon black electrically charged to be anionic by bonding —COOM, —SO$_3$M to the carbon black surface is especially preferable because dispersion in the ink is good.

Among those represented by M in the above hydrophilic group, specific examples of alkali metal include Li, Na, K, Rb, Cs, and the like. Also, specific examples of the organic ammonium include methylammonium, dimethylammonium, trimethylammonium, ethylammonium, diethylammonium, triethylammonium, methanolammonium, dimethanolammonium, trimethanolammonium, and the like.

As a method of producing a self-dispersion carbon black electrically charged to be anionic, a method of subjecting carbon black to an oxidation treatment with sodium hypochlorite can be cited as an example. By this method, a —COONa group can be chemically bonded to the carbon black surface.

Also, the aforementioned hydrophilic group can be directly bonded to the carbon black surface. Alternatively, by allowing another atomic group to intervene between the carbon black surface and the aforesaid hydrophilic group, the aforesaid hydrophilic group may be indirectly bonded to the carbon black surface. Specific examples of other atomic groups include a straight-chain or branched-chain alkylene group having one to twelve carbon atoms, a substituted or non-substituted phenylene group, and a substituted or non-substituted naphthylene group. Examples of the substituents in the phenylene group and the naphthylene group include a straight-chain or branched-chain alkyl group having one to six carbon atoms. Also, specific examples of a combination of another atomic group and a hydrophilic group include —C$_2$H$_4$—COOM, —Ph—SO$_3$M, —Ph—COOM, and the like (here, Ph represents a phenylene group, and M is a hydrogen atom, an alkali metal, an ammonium, or an organic ammonium.).

The content of the black pigment in the ink of the present invention is preferably 0.1 mass % or more and 5 mass % or less, particularly 0.2 mass % or more and 2 mass % or less, with respect to the total mass of the ink. When the content is below 0.1 mass %, a desired optical density may not be obtained. When the content exceeds 5 mass %, the gloss property may be insufficient when the ink is printed on a recording medium provided with a porous material having a cationic electric charge on a supporting material.

Also, in the ink of the present invention, the mass ratio of the content of the dye to the content of the pigment preferably satisfies (content of dye/content of pigment)>5. When the mass ratio is 5 or below, a metal luster may be generated to decrease the image density. Also, in particular, it is preferable that 20≧(content of dye/content of pigment)>5. When the mass ratio exceeds 20, the effect on the image density and the fastness may not be sufficiently obtained.

(Reason Why the Effect of the Present Invention is Obtained)

The inventors of the present invention surmise, as follows, the reason why the high fastness and the high image quality are compatible with each other by using the above dye and the pigment in combination.

The compounds represented by the following formula (I) or salts thereof, or the compounds represented by the following formula (II) or salts thereof are dyes that are especially excellent in fastness as compared with conventional dyes. Also, when compared in the same ink composition, the permeation into a recording medium in which the ink receiving layer is formed with porous fine particles is comparatively low. It seems that the fastness thereby can be maintained to be high even if the content of the black pigment in the ink is reduced.

Also, the compounds represented by the following formula (I) or salts thereof, or the compounds represented by the following formula (II) or salts thereof have four or more azo groups in the molecule structure thereof, so that the molecule size is larger as compared with dis-azo and tris-azo dyes that are conventionally often used. It seems that, with a recording medium, such as an ordinary paper, into which a pigment is easily permeated, since the molecule size of the dye is large, the pigment is easily trapped between the dyes, and the pigment can be distributed around the recording medium surface layer, thereby effectively improving the image density. On the other hand, it seems that, with a recording medium, such as a glossy paper, into which a pigment is unlikely to permeate and tends to aggregate on the recording medium surface, the aggregation of the pigment is alleviated by using a dye and a pigment in combination. However, it seems that, with the dye used in the present invention, the permeation of the dye into the recording medium is restrained, so that the dye acts to alleviate the aggregation of the pigment on the recording medium surface more effectively as compared with a dye that permeates deep into the recording medium.

[Other Coloring Materials]

In the present invention, in addition to the dye and the pigment described above, other dyes may be used as a coloring material for color toning.

Also, in order to form full-color images and the like, an ink having a color tone different from the ink of the present invention can be used in combination. For example, a cyan ink, a magenta ink, a yellow ink, or the like may be used. Also, a light-color ink having the same color tone as these inks may be used in combination. For the coloring materials for these inks having a different color tone or light-color inks, either a known dye or a newly synthesized coloring material can be used.

Hereafter, specific examples of the dye for color toning and the dyes used in the other inks to be used in combination with the black ink of the present invention will be shown for each color tone. It goes without saying that the present invention is not limited to these alone.

(Magenta Coloring Material)

C. I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and others C. I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and others C. I. Food Red: 87, 92, 94, and others C. I. Direct Violet: 107 and others (Cyan Coloring Material)

C. I. Direct Blue: 1, 15, 22, 25, 41, 76, 77, 80, 86, 90, 98, 106, 108, 120, 158, 163, 168, 199, 226, 307, and others C. I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and others (Yellow Coloring Material)

C. I. Direct Yellow: 8, 11, 12, 27, 28, 33, 39, 44, 50, 58, 85, 86, 87, 88, 89, 98, 100, 110, 132, 173, and others C. I. Acid Yellow: 1, 3, 7, 11, 17, 23, 25, 29, 36, 38, 40, 42, 44, 76, 98, 99, and others (Black Coloring Material)

C. I. Direct Black: 17, 19, 22, 31, 32, 51, 62, 71, 74, 112, 113, 154, 168, 195, and others C. I. Acid Black: 2, 48, 51, 52, 110, 115, 156, and others C. I. Food Black: 1, 2, and others

[Aqueous medium]

The ink of the present invention is prepared by dissolving or dispersing the above-mentioned coloring materials into an aqueous medium containing water as a major component. As this aqueous medium, those containing water alone or containing water and a water-soluble organic solvent can be used. As the aforesaid water-soluble organic solvent, those generally used as a solvent of an ink for ink jet, such as aliphatic monohydric alcohol, polyhydric alcohol, glycol ether, nitrogen-containing polar solvent, or sulfur-containing polar solvent are applirable. Also, these water-soluble organic solvents can be used either alone or as a combination of plural solvents. Also, it is preferable to use water or deionized water (ion exchange water).

The content of these water-soluble organic solvents is preferably 5 mass % to 90 mass %, and further, more preferably 10 mass % to 50 mass %, with respect to the total mass of the ink. When the content is below this range, the reliability of ejection property may possibly be aggravated when the ink is used for ink jet. When the content is above this range, poor ink supply may possibly be occurred due to rise in the ink viscosity. Also, the content of water is preferably 30 mass % to 95 mass % with respect to the total mass of the ink so that the solubility of the dye or the dispersibility of the pigment may be good; the ink may have a viscosity that can give an ejection stability; and clogging may not occur at the tip end of the nozzle.

[Other Additives]

Further, the ink of the present invention may contain various additives if needed, such as a nitrogen-containing compound such as urea or ethylene urea, a surfactant, a pH adjusting agent, a rust preventive agent, an antiseptic agent, a mildewproofing agent, an antioxidant, a reduction preventive agent, an evaporation promoting agent, a chelating agent, and a water-soluble polymer.

<Recording Medium>

As the recording medium to be used in forming an image using the ink of the present invention, any recording medium can be used as long as it is a recording medium on which recording is made by applying an ink. Above all, a recording medium is preferable in which the ink receiving layer is formed with porous fine particles having a cationic electric charge. Further, a recording medium is preferable in which the ink receiving layer is formed mainly with fine particles having an average particle size of 1 μm or less.

Specific examples of the aforesaid fine particles include silica fine particles and aluminum oxide fine particles. Those preferable as the silica fine particles are silica fine particles represented by colloidal silica. Colloidal silica itself is commercially available; however, in particular, those disclosed in Japanese Patent Nos. 2803134 and 2881847, for example, are preferable. Those preferable as the aluminum oxide fine particles are alumina hydrate fine particles and the like. As one of such alumina series pigments, an alumina hydrate represented by the following formula can be cited as an example.

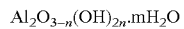

$Al_2O_{3-n}(OH)_{2n} \cdot mH_2O$ (In the above formula, n represents any of the integers 1, 2 and 3, and m represents a value of 0 to 10, preferably 0 to 5. However, m and n are not both zero. In many cases, $mH_2O$ represents also an aqueous phase that is not involved in the formation of the $mH_2O$ crystal lattice and can be eliminated, so that m can be an integer or a value other than an integer. Also, when materials of these kinds are heated, m may reach a value of zero.)

The alumina hydrate can be produced by a known method such as hydrolysis of aluminum alkoxide and hydrolysis of sodium aluminate disclosed in U.S. Pat. Nos. 4,242,271 and 4,202,870, or a method of neutralization by adding an aqueous solution of sodium sulfate, aluminum chloride, or the like to an aqueous solution of sodium aluminate or the like disclosed in Japanese Patent Application Publication No. S57-44605.

The recording medium using the above-described alumina hydrate is preferable because the gloss, the transparency and the fixation property of the coloring materials in the ink, and the like are excellent, which properties are needed in realizing a photograph image quality as described above.

Specific examples of the binder include water-soluble polymers, latex, and others. For example, polyvinyl alcohol or denatured products thereof, starch or denatured products thereof, gelatin or denatured products thereof, gum arabic, cellulose derivatives such as carboxymethyl cellulose, hydroxyethyl cellulose, and hydroxypropyl methyl cellulose, vinyl series copolymer latex such as SBR latex, NBR latex, methyl methacrylate-butadiene copolymer latex, functional-group-denatured polymer latex, and ethylene vinyl acetate copolymer, polyvinylpyrrolidone, maleic anhydride or copolymer thereof, acrylic ester copolymer, and the like are used. It is possible to use one kind or two or more kinds in combination selected from these, if needed.

The mixing ratio of the fine particles to the binder is preferably 1:1 to 100:1 in terms of mass ratio. A preferable content of the aluminum oxide fine particles or silica fine particles in the ink receiving layer is 50 mass % or more, more preferably 70 mass % or more, still more preferably 80 mass % or more, and it is most suitably 99 mass % or less. The application amount of the ink receiving layer is preferably at least 10 g/m$^2$, most suitably 10 to 60 g/m$^2$, as converted in terms of dried solid components.

The recording medium preferably has a supporting material for supporting the aforementioned ink receiving layer. The supporting material is not particularly limited and any supporting material can be used as long as it can form the ink receiving layer with the aforementioned porous fine particles and as long as it can give a rigidity that makes the recording medium transportable by a transportation mechanism such as an ink jet printer. For example, those having a porous layer formed by applying an inorganic pigment or the like such as barium sulfate, titanium oxide, or zinc oxide together with a binder between the supporting material and the ink receiving layer can be used, or else resin coated paper may be used in the supporting material.

Other additives may be used in the ink receiving layer. For example, a dispersant, a thickening agent, a pH adjusting agent, a lubricant, a fluidity denaturing agent, a surfactant, an anti-foaming agent, a releasing agent, a fluorescent whitening agent, an ultraviolet absorbing agent, an antioxidant, and the like can be cited if needed.

<Ink Set>

The ink of the present invention can be used also in a case in which the ink is combined with other inks to form an ink set. The ink set in the present invention refers to a state in which the ink of the present invention is used together with other inks such as cyan ink, magenta ink, yellow ink, and black ink. Also, there is no particular limitation on the other inks that can be combined as an ink set. The ink set in the present invention is meant to include not only an ink tank itself in which a plurality of ink tanks are integrated but also a case of using a plurality of single ink tanks in combination, and further to include a case in which the aforesaid ink tank and a recording head are integrated.

<Ink Jet Recording Method>

The ink according to the present invention is particularly suitably used for an ink jet recording method including the step of ejecting the ink by an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by using the ink according to the present invention includes an ink cartridge including an ink storage portion for storing the ink.

<Recording Unit>

An example of a recording unit suitable for performing recording by using the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by using the ink according to the present invention includes a recording apparatus in which thermal energy corresponding to a recording signal is applied to ink in the chamber of a recording head having an ink storage portion for storing the ink to generate an ink droplet by virtue of the energy.

The schematic constitution of a mechanism portion of an ink jet recording apparatus will be described below. A recording apparatus main body is constituted of a sheet feeding portion, a sheet conveying portion, a carriage portion, a sheet discharge portion, and a cleaning portion, and an external packaging portion for protecting them and providing them with a design, each of which plays a role of each mechanism. The outline of each of them will be described below.

Figure 2:
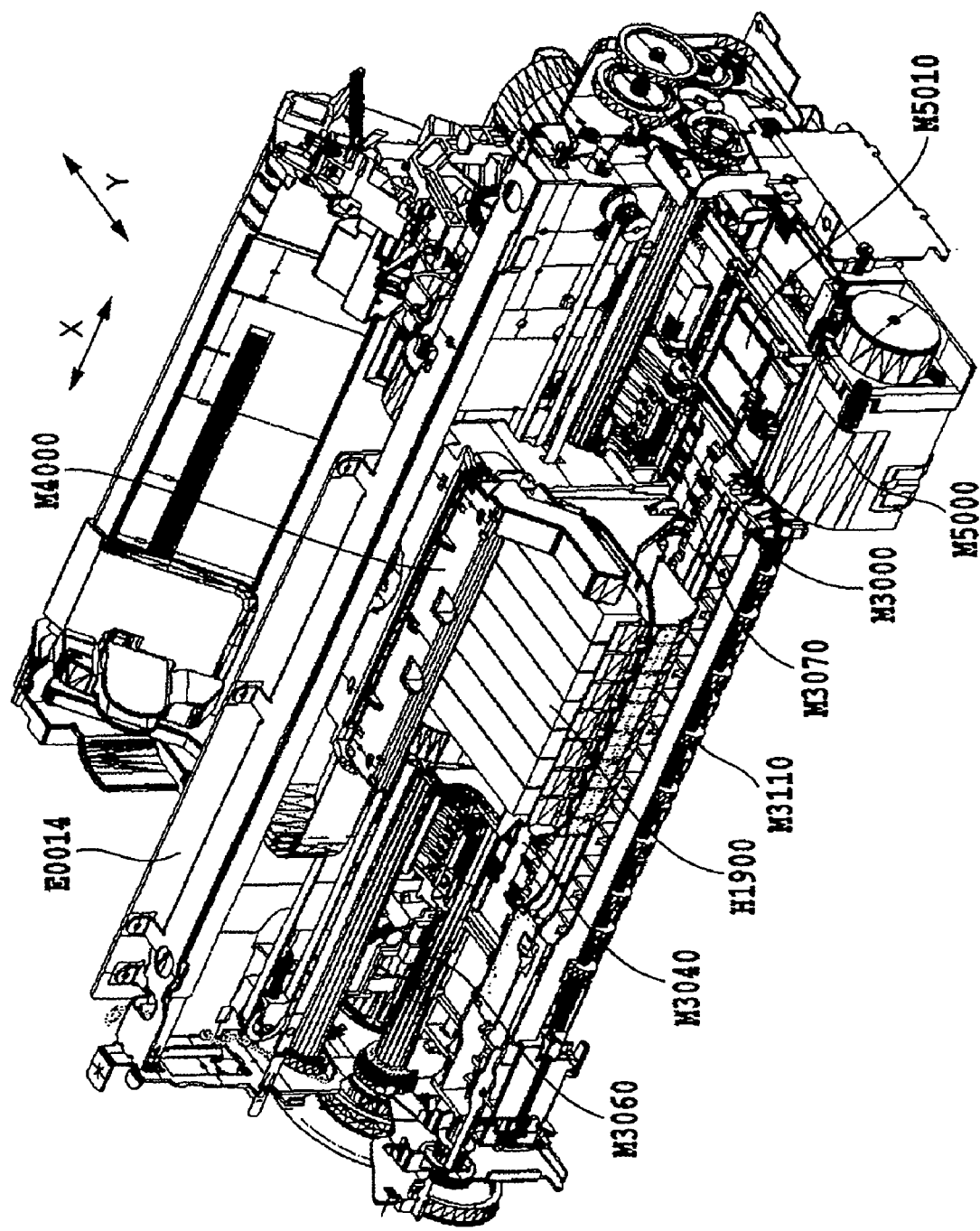
FIG. 2 is a perspective view of a mechanism portion of the recording apparatus.
Figure 3:
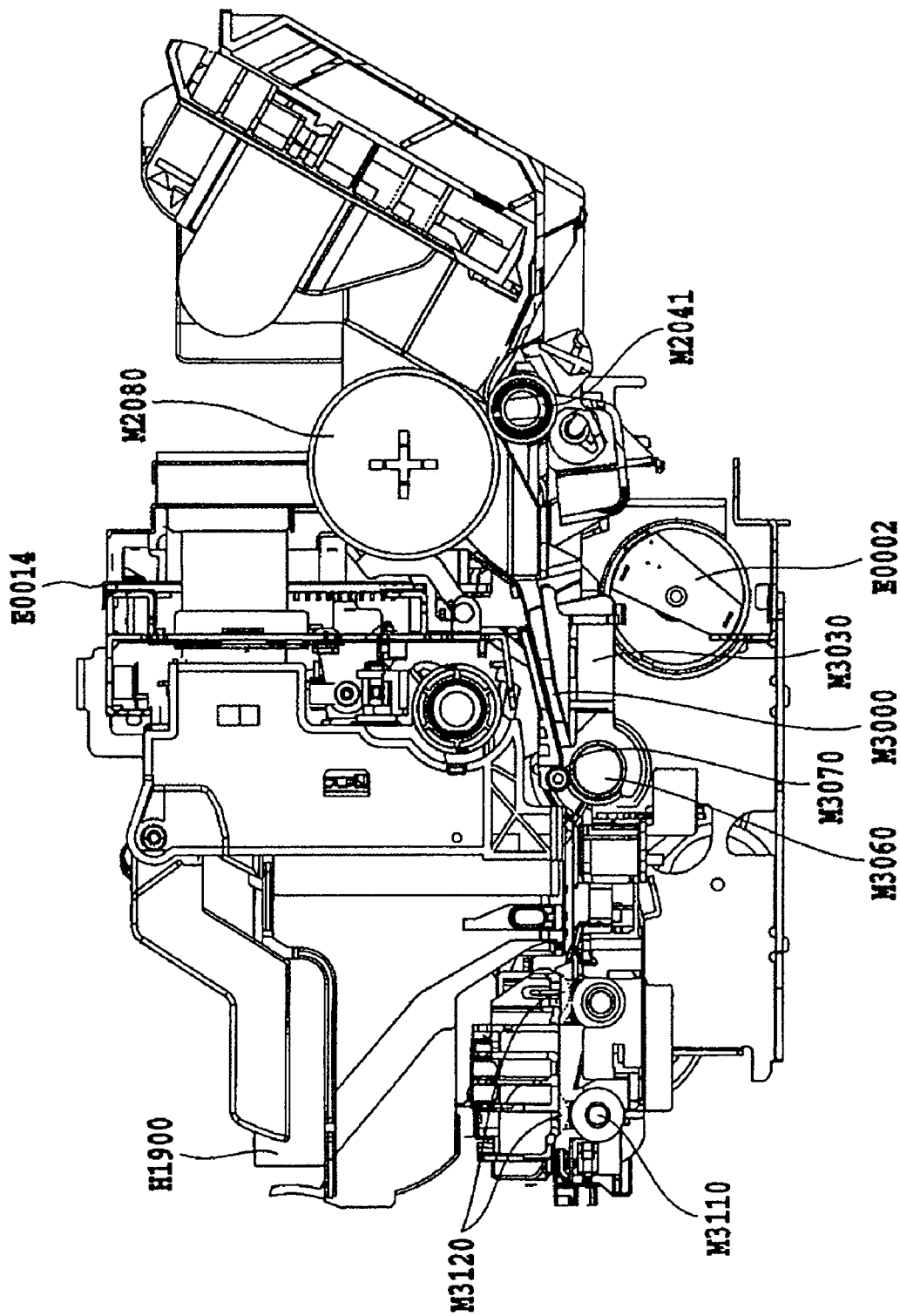
FIG. 3 is a sectional view of the recording apparatus.

FIG. 1 is a perspective view of a recording apparatus. FIGS. 2 and 3 are views for explaining the internal mechanism of a recording apparatus main body. FIG. 2 is a perspective view seen from an upper right portion, and FIG. 3 is a side sectional view of the recording apparatus main body.

When sheets are fed in the recording apparatus, only the predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 4) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in the column direction and sub scanning in which a recording medium is conveyed in the row direction by the conveying roller M3060 are alternately repeated, whereby an image is formed on the recording medium.

Finally, the recording medium on which an image has been formed is pinched at a nip between a first sheet discharge roller M3110 and a spur M3120 in the sheet discharge portion, conveyed, and discharged to a sheet discharge tray M3160.

In the cleaning portion, when a pump M5000 is allowed to act in such a state that a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither sticking of the remaining ink nor a subsequent harmful effect occurs.

(Constitution of Recording Head)

The constitution of a head cartridge H1000 will be described below. The head cartridge H1000 includes the recording head H1001, means for mounting ink tanks H1900, and means for supplying ink from the ink tanks H1900 to the recording head, and is detachably mounted on the carriage M4000.

Figure 4:
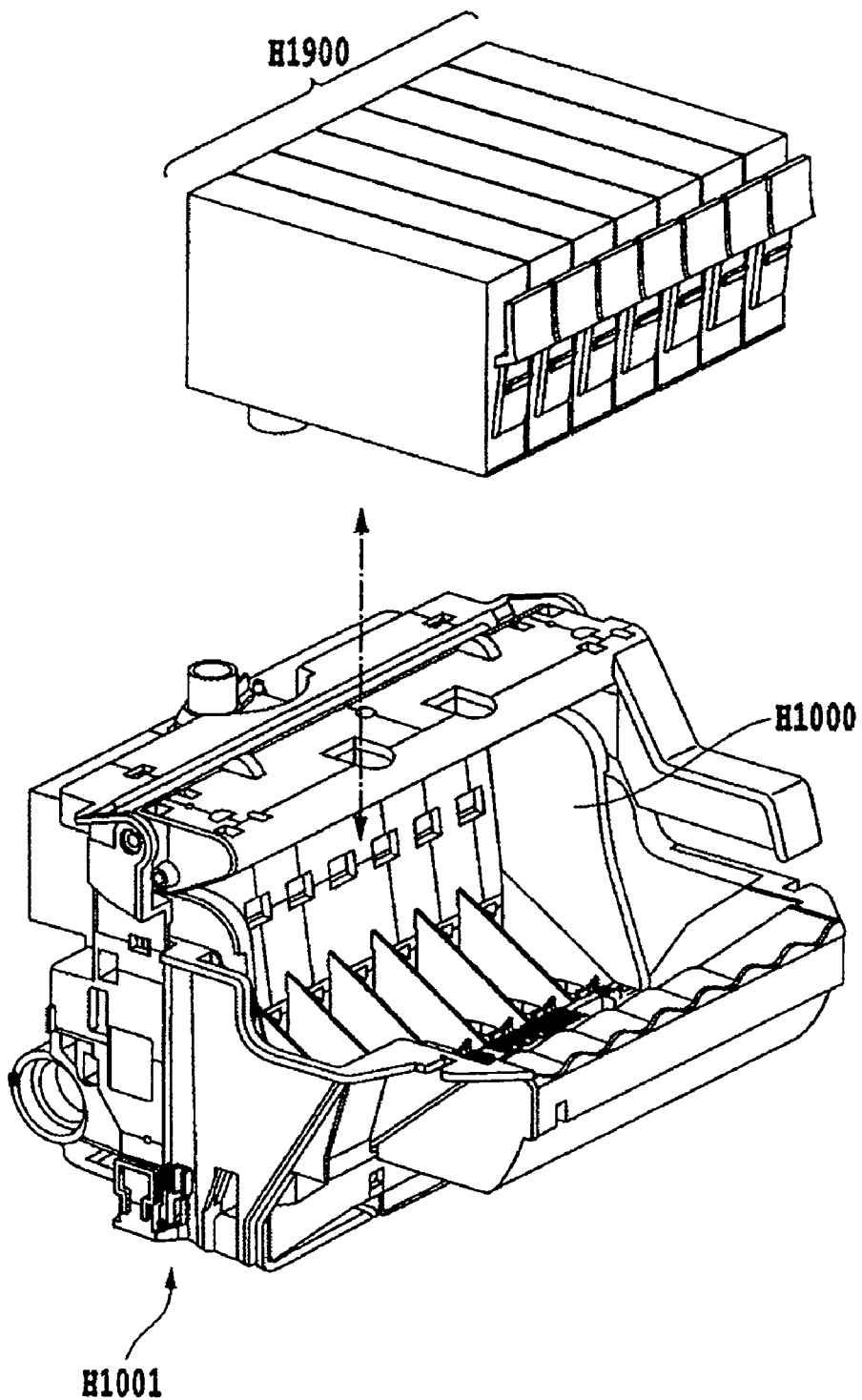
FIG. 4 is a perspective view showing a state in which an ink tank is mounted on a head cartridge.

FIG. 4 shows how the ink tanks H1900 are mounted on the head cartridge H1000. The recording apparatus forms images by means of yellow, magenta, cyan, black, light-color magenta, light-color cyan, and green inks, and so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in such a state that the head cartridge H1000 is mounted on the carriage M4000.

Figure 5:
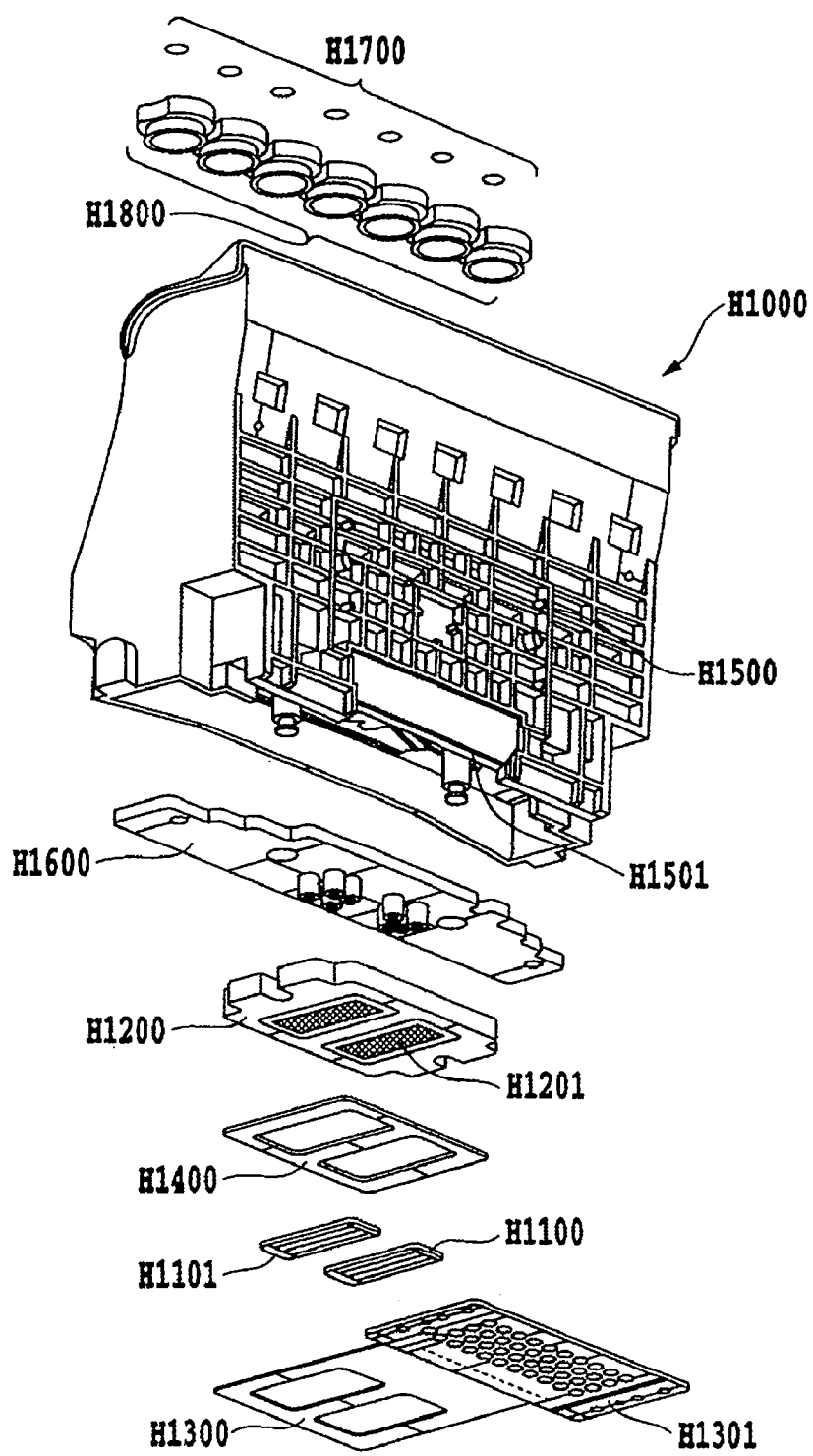
FIG. 5 is an exploded perspective view of the head cartridge.

FIG. 5 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is a Si substrate having multiple recording elements (nozzles) for ejecting ink formed on one side by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 6:
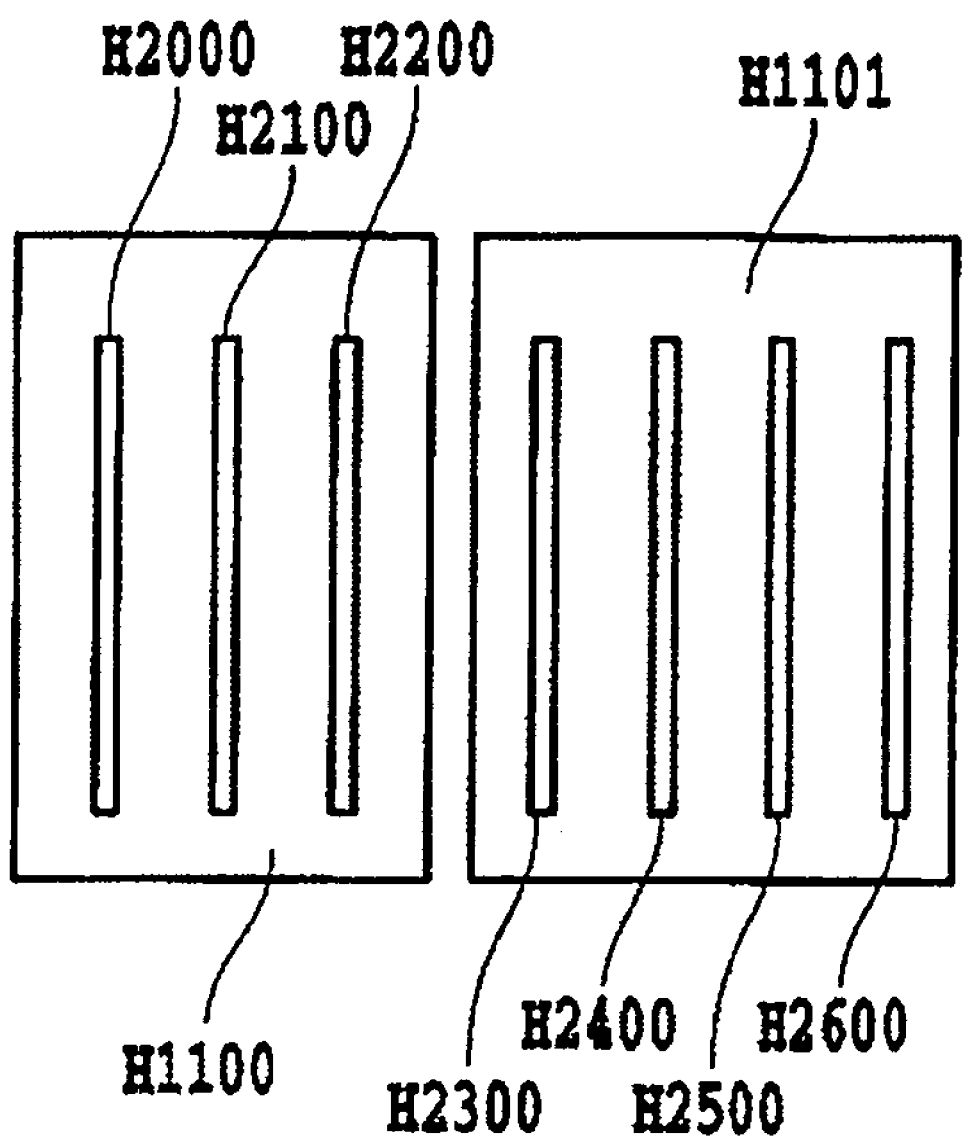
FIG. 6 is a front view showing a recording element substrate in the head cartridge.

FIG. 6 is an enlarged front view for explaining the constitution of each of the first recording element substrate H1100 and the second recording element substrate H1101. Reference symbols H2000 to H2600 denote recording element trains (hereinafter referred to also as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which light-color cyan ink is supplied, the nozzle train H2400 to which black ink is supplied, the nozzle train H2500 to which orange ink is supplied, and the nozzle train H2600 to which light-color magenta ink is supplied.

Each nozzle train is constituted by 768 nozzles arranged at intervals of 1,200 dpi (dot/inch; reference value) in the conveying direction of a recording medium, and each nozzle ejects about 2 pl of ink. An opening area in each nozzle ejection port is set to be about 100 μm$^2$. The first recording element substrate H1100 and the second recording element substrate H1101 are bonded and fixed to the first plate H1200 having ink supply ports H1201 formed thereon for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 impresses electrical signals for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at the end portion of the electric wiring to receive electrical signals from the recording apparatus main body. The external signal input terminal H1301 is positioned and fixed to the back surface side of the tank holder H1500.

The flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at the end portion on the ink tank side of the ink flow path H1501 engaged with the ink tanks H1900, and so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is made up by connecting a tank holder portion constituted of the tank holder H1500, the flow path forming member H1600, the filter H1700 and the seal rubber H1800, with the recording head portion H1001 constituted of the first recording element substrate H1100, the second recording element substrate H1101, the first plate H1200, the electric wiring substrate H1300 and the second plate H1400 by the use of an adhesive or the like.

Description has been made here by taking, as an example of an embodiment of a recording head, a recording head according to a bubble jet (registered trademark) method that performs recording by means of an electrothermal converter (recording element) for generating thermal energy for causing ink to generate film boiling in accordance with an electrical signal.

As for the representative structure and principle, it is preferred to use basic principles disclosed in, for example, U.S. Pat. Nos. 4,723,129 and 4,740,796. The method is applicable to any one of a so-called on-demand type and a so-called continuous type. In particular, the method is effective for the on-demand type because of the following reason. At least one driving signal which corresponds to recording information and causes a sudden increase in temperature exceeding nuclear boiling is applied to electrothermal converters arranged corresponding to a sheet or liquid flow path holding a liquid (ink), thereby causing the electrothermal converter to generate thermal energy. Then, film boiling is generated on the thermal action surface of a recording head. As a result, an air bubble in the liquid (ink) can be formed so as to be in one-to-one correspondence with the driving signal. The growth and contraction of the air bubble eject the liquid (ink) through an opening for ejection, thereby forming at least one droplet. It is more preferable that the driving signal is of a pulse shape because the growth and contraction of an air bubble can be performed immediately and appropriately, and hence the liquid (ink) can be ejected with excellent responsiveness.

As an example of a second embodiment of an ink jet recording apparatus utilizing mechanical energy, an on-demand ink jet recording head may be cited, including: a nozzle forming substrate having multiple nozzles; pressure generating means arranged so as to be opposite to the nozzles and composed of a piezoelectric material and a conductive material; and ink filling the surroundings of the pressure generating means, in which the pressure generating means is displaced by an applied voltage to eject a small ink droplet from a nozzle.

The ink jet recording apparatus is not limited to such apparatuses as described above in which a head and an ink tank are separated, and may be one in which a head and an ink tank are unified so that they are unseparable. The ink tank may be separably or unseparably unified with the head to be mounted on a carriage, or may be mounted at a fixing portion of an apparatus to supply ink to a recording head through an ink supply member such as a tube. When the ink tank is provided with a constitution for applying a suitable negative pressure to the recording head, an absorber may be arranged in an ink storage portion of the ink tank, or the ink tank may have a flexible ink storage bag and a spring portion for applying bias in the direction of expanding the internal volume of the bag. The recording apparatus may adopt a serial recording method as described above, or may be in the form of a line printer obtained by aligning recording elements over the range corresponding to the entire width of a recording medium.

EXAMPLES

Hereafter, the present invention will be described further in detail with reference to Examples and Comparative Examples; however, the present invention is in no way limited by the following Examples unless the present invention exceeds the gist thereof. Here, unless specifically designated, the ink components in the Examples and Comparative Examples mean "mass part".

<Preparation of Coloring Material>

[Preparation of Exemplified Compound 1]

A compound of the following formula (A) was added to and dissolved in water to which sodium carbonate had been added, further followed by addition of hydrochloric acid and sodium nitrite to perform diazotization. To this diazotized turbid suspension, an aqueous solution of 6-phenylamino-1-hydroxynaphthalene-3-sulfonic acid was added, and the mixture obtained was dissolved in the presence of sodium carbonate to obtain a reaction solution (A). Next, 2-aminosulfonic acid was dissolved in the presence of sodium hydroxide, followed by addition of hydrochloric acid and sodium nitrite to perform diazotization. Next, 6-amino-1-hydroxynaphthalene-3-sulfonic acid was dissolved in the presence of sodium hydroxide, followed by addition of acetic anhydride to perform acetylation. To this, the above diazotized turbid suspension was added dropwise in the presence of sodium carbonate to perform coupling reaction to obtain a reaction liquid (A). To this reaction liquid (A), sodium hydroxide and then sodium chloride were added to perform salting-out to obtain a compound. This compound was dissolved in water in the presence of sodium hydroxide, followed by addition of hydrochloric acid and sodium nitrite to perform diazotization. To this diazotized turbid suspension, the reaction solution (A) was added dropwise in the presence of sodium carbonate to complete coupling reaction to obtain a reaction liquid. This reaction liquid was salted out with sodium chloride, followed by filtration to obtain a compound (A). 2-Nitro-4-cresol, toluene and potassium hydroxide were added to N,N-dimethylformamide, and water was evaporated off by azeotropy with toluene, where propanesultone was dropwise added, followed by addition of sodium hydroxide. This was concentrated, and thereafter, in an autoclave, palladium carbon was added thereto, followed by enclosure of hydrogen gas to obtain a solution. This solution was diazotized by adding hydrochloric acid and sodium nitrite, followed by dropwise addition of the above reaction liquid (A) to complete coupling reaction in the presence of sodium hydroxide to obtain a reaction liquid. This reaction liquid was diazotized by adding hydrochloric acid and sodium nitrite. This diazotized turbid suspension was added to an aqueous solution in which the above compound (A) was dissolved, to complete coupling reaction. This was salted out with sodium chloride, followed by filtration and washed to obtain an exemplified compound 1 (sodium salt).

[Preparation of Exemplified Compound 4]

A compound of the following formula (B) was added to water to which sodium hydroxide had been added, and thereby dissolved. To resulting solution was added an aqueous solution of sodium nitrite, whereby to perform diazotization. The resulting diazotized turbid suspension was added dropwise to an aqueous alkali solution of 6-amino-1-hydroxynaphthalene-3,5-disulfonic acid, whereby to perform coupling reaction. The resulting product was then salted out with sodium chloride. The salted out product was filtered and washed. Next, the above compound was added to water to which sodium hydroxide had been added, and thereby dissolved. To the resulting solution were added hydrochloric acid and sodium nitrite, whereby to perform diazotization. To this diazotized turbid suspension were added 8-amino-1-hydroxynaphthalene-3,6-disulfonic acid and then sodium carbonate. The resulting mixture was stirred overnight, to thereby obtain a reaction liquid A. Next, 1-amino-2-benzenesulfonic acid was added to water to which sodium hydroxide had been added, and thereby dissolved. To the resulting solution was added an aqueous solution of sodium nitrite, whereby to perform diazotization. This diazotized turbid suspension was added dropwise to an aqueous alkali solution of 6-amino-1-hydroxynaphthalene-3-sulfonic acid, whereby to perform a coupling reaction. The resulting product was then salted out with sodium chloride. The salted out product was filtered and washed. Subsequently, the above compound was added to water to which sodium hydroxide had been added, and thereby dissolved. To the resulting solution were added hydrochloric acid and sodium nitrite, whereby to perform diazotization. This diazotized turbid suspension was added to the above reaction liquid (B), whereby to perform coupling reaction. The resulting product was then salted out with sodium chloride. The salted out product was filtered and washed, to obtain an exemplified compound 4 (sodium salt).

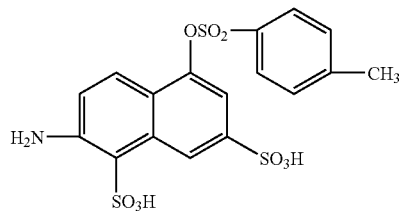

Formula (A)

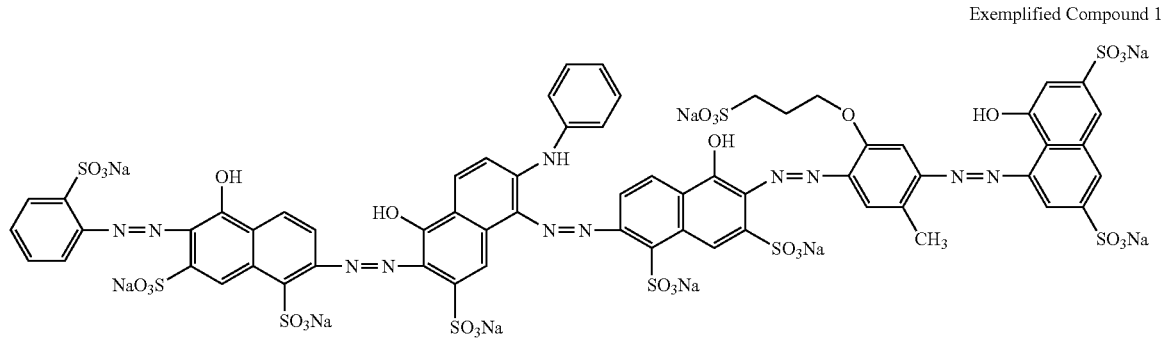

Exemplified Compound 1

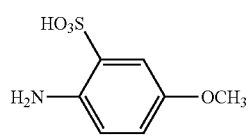

Formula (B)

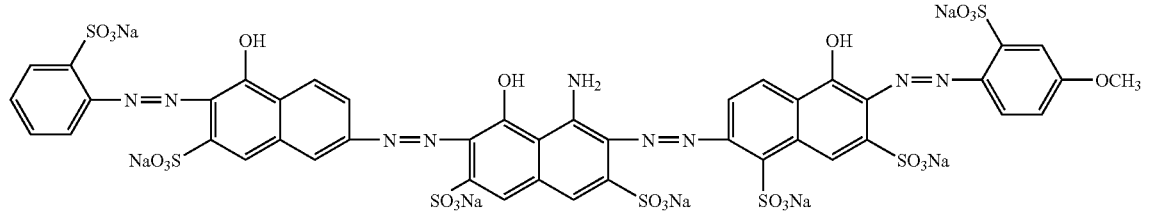

Exemplified Compound 4

[Preparation of Pigment Dispersion Solution A]

To a solution obtained by adding 5 g of concentrated hydrochloric acid to 5.3 g of water, 1.58 g of anthranilic acid was added in a cooled state at 5° C. Subsequently, a vessel containing this solution was put into an ice bath, and the liquid was stirred so as to keep the solution at 10° C. or below at all times. To this, a solution obtained by dissolving 1.78 g of sodium nitrite into 8.7 g of water of 5° C. was added. This solution was further stirred for 15 minutes, and then 7 g of carbon black having a specific surface area of 220 m$^2$/g and a DBP oil absorption amount of 105 mL/100 g was added under stirring. Thereafter, the mixture was further stirred for 15 minutes. After the obtained slurry was filtered with a paper filter (trade name: Paper Filter for Standard Use No. 2; manufactured by Advantec), the particles were sufficiently washed with water, followed by drying in an oven at 110° C. to prepare a self-dispersion carbon black A. Further, water was added to the self-dispersion carbon black A obtained in the above for dispersion so that the pigment concentration would be 10 mass %, thereby preparing a dispersion solution. By the above-described method, a pigment dispersion solution A in which the self-dispersion carbon black A is dispersed in water was obtained.

[Preparation of Pigment Dispersion Solution B]

After 10 g of carbon black having a specific surface area of 240 m$^2$/g and a DBP oil absorption amount of 65 mL/100 g, 1.2 g of p-aminobenzoic acid, and 72 g of water were well mixed, 1.62 g of nitric acid was added dropwise to this mixture, followed by stirring at 70° C. After several minutes, a solution obtained by dissolving 1.07 g of sodium nitrite into 5 g of water was added to this mixture. This solution was further stirred for one hour. After the obtained slurry was filtered with a paper filter (trade name: Paper Filter for Standard Use No. 2; manufactured by Advantec), the particles were sufficiently washed with water, followed by drying in an oven at 90° C. to prepare a self-dispersion carbon black B. Further, water was added to the self-dispersion carbon black B obtained in the above for dispersion so that the pigment concentration would be 10 mass %, thereby preparing a dispersion solution. By the above-described method, a pigment dispersion solution B in a state which the self-dispersion carbon black B is dispersed in water was obtained.

<Preparation of Ink>

With the use of the exemplified compound 1 as a compound represented by the general formula (I) or a salt thereof, the exemplified compound 4 as a compound represented by the general formula (II) or a salt thereof, and the pigment dispersion solutions A and B, the components shown in Tables 3 and 4 were mixed and sufficiently stirred, followed by pressure filtration with a filter having a pore size of 0.20 μm to prepare the inks of the Examples 1 to 9 and the Comparative Examples 1 to 6.

TABLE 3

| | Examples | | | | | | | | |
|---|---|---|---|---|---|---|---|---|---|
| | 1 | 2 | 3 | 4 | 5 | 6 | 7 | 8 | 9 |
| Exemplified compound 1 | 4.0 | 4.0 | 4.0 | | | 4.0 | 2.0 | 4.0 | |
| Exemplified compound 4 | | | | 4.0 | 4.0 | | 2.0 | | 4.0 |
| Pigment dispersion solution A | 2.0 | 5.0 | | 2.0 | 5.0 | 7.0 | 2.0 | 8.0 | 8.0 |
| Pigment dispersion solution B | | | 3.0 | | | | | | |
| (Pigment solid component concentration) | (0.2) | (0.5) | (0.3) | (0.2) | (0.5) | (0.7) | (0.2) | (0.8) | (0.8) |
| Glycerin | 10.0 | 10.0 | 10.0 | 10.0 | 10.0 | 10.0 | 10.0 | 10.0 | 10.0 |
| Ethylene glycol | 8.0 | 8.0 | 8.0 | 8.0 | 8.0 | 8.0 | 8.0 | 8.0 | 8.0 |
| Acetylenol EH (*) | 1.0 | 1.0 | 1.0 | 1.0 | 1.0 | 1.0 | 1.0 | 1.0 | 1.0 |

TABLE 3-continued

|  | Examples | | | | | | | | |
|---|---|---|---|---|---|---|---|---|---|
|  | 1 | 2 | 3 | 4 | 5 | 6 | 7 | 8 | 9 |
| Ion exchange water | 75.0 | 72.0 | 74.0 | 75.0 | 72.0 | 70.0 | 75.0 | 69.0 | 69.0 |
| Content of dye/content of pigment | 20.0 | 8.0 | 13.3 | 20.0 | 8.0 | 5.7 | 20.0 | 5.0 | 5.0 |

(*1) acetylene glycol ethylene oxide adduct (surfactant) manufactured by Kawaken Fine Chemicals Co., Ltd.

TABLE 4

|  | Comparative Examples | | | | | |
|---|---|---|---|---|---|---|
|  | 1 | 2 | 3 | 4 | 5 | 6 |
| Exemplified compound 1 | 4.0 | | | | | |
| Exemplified compound 4 | | 4.0 | | | | |
| C. I. Direct Black 195 | | | 4.0 | 4.0 | | 4.0 |
| C. I. Direct Black 168 | | | | | 4.0 | |
| Pigment dispersion solution A | | | | 3.0 | 3.0 | 8.0 |
| (Pigment solid component concentration) | | | | (0.3) | (0.3) | (0.8) |
| Glycerin | 10.0 | 10.0 | 10.0 | 10.0 | 10.0 | 10.0 |
| Ethylene glycol | 8.0 | 8.0 | 8.0 | 8.0 | 8.0 | 8.0 |
| Acetylenol EH (*1) | 1.0 | 1.0 | 1.0 | 1.0 | 1.0 | 1.0 |
| Ion exchange water | 77.0 | 77.0 | 77.0 | 74.0 | 74.0 | 69.0 |
| Content of dye/content of pigment | — | — | — | 13.3 | 13.3 | 5.0 |

(*1) acetylene glycol ethylene oxide adduct (surfactant) manufactured by Kawaken Fine Chemicals Co., Ltd.

<Evaluation>

The inks of Examples 1 to 9 and Comparative Examples 1 to 6 obtained in the above were respectively mounted on a color ink jet printer which is an ink jet recording apparatus having an on-demand type multiple recording head that ejects ink by giving thermal energy corresponding to a recording signal to the ink, and evaluation was carried out on the following evaluation items.

(1) Reflection Density

Gradation tone patches with an ink application amount of 10% to 100% were printed on a copying paper (trade name: Office Planner; manufactured by Canon) and a glossy paper (trade name: PR-101; manufactured by Canon). After being naturally dried for 24 hours, the obtained printed matters were subjected to measurement of reflection density (OD) in an image with an ink application amount of 50% (half tone) with a spectrophotometer (trade name: Spectrolino; manufactured by Gretag Macbeth).

(2) Color Tone (Color Saturation)

Gradation tone patches with an ink application amount of 10% to 100% were printed on a copying paper (trade name: Office Planner; manufactured by Canon) and a glossy paper (trade name: PR-101; manufactured by Canon). After being naturally dried for 24 hours, the obtained printed matters were subjected to measurement of the values of L*, a*, and b* in an image with an ink application amount of 50% (half tone) with a spectrophotometer (trade name: Spectrolino; manufactured by Gretag Macbeth), so as to calculate the color saturation C*. The calculation method is as follows. Here, for the color tone as the black ink, the smaller the value of the color saturation C* is, the more preferable it is.

$$C^* = \{(L^*)^2 + (a^*)^2 + (b^*)^2\}^{1/2}$$

(3) Gas Resistance (OD Residual Ratio)

Gradation tone patches with an ink application amount of 10% to 100% were printed on a copying paper (trade name: Office Planner; manufactured by Canon) and a glossy paper (trade name: PR-101; manufactured by Canon). After being naturally dried for 24 hours, the obtained printed matters were left to stand for two hours in an ozone fade meter under a condition with a temperature inside a tank of 40° C., a relative humidity of 55%, and an ozone atmosphere of 3 ppm. The OD residual ratio was calculated by using the following formula (1) from the optical density (OD value) in an image (half tone) with an ink application amount of 50% on the printed matters before and after the gas resistance test.

OD residual ratio=(Optical density (OD value) after gas resistance test/optical density (OD value) before gas resistance test)×100        Formula (1)

The evaluation results are shown in Tables 5 and 6. Also, the results of eye observation on the presence or absence of metal luster in an image with an ink application amount of 100% are shown in Table 7.

TABLE 5

| | | Examples | | | | | | | | |
|---|---|---|---|---|---|---|---|---|---|---|
| | | 1 | 2 | 3 | 4 | 5 | 6 | 7 | 8 | 9 |
| Paper | Dye | Chemical 1 | Chemical 1 | Chemical 1 | Chemical 2 | Chemical 2 | Chemical 1 | Chemical 1/Chemical 2 | Chemical 1 | Chemical 2 |
| | Ratio (*2) | 20.0 | 8.0 | 13.3 | 20.0 | 8.0 | 5.7 | 20.0 | 5.0 | 5.0 |
| Office Planner | Reflection density (OD) | 0.87 | 0.89 | 0.88 | 0.87 | 0.87 | 0.89 | 0.90 | 0.91 | 0.90 |
| | Color tone (color saturation C*) | 45 | 44 | 45 | 45 | 44 | 44 | 43 | 42 | 43 |
| | Gas resistance | >98 | >98 | >98 | >98 | >98 | >98 | >98 | >98 | >98 |

TABLE 5-continued

| | | Examples | | | | | | | | |
|---|---|---|---|---|---|---|---|---|---|---|
| | | 1 | 2 | 3 | 4 | 5 | 6 | 7 | 8 | 9 |
| | (OD residual ratio) | | | | | | | | | |
| PR-101 | Reflection density (OD) | 1.45 | 1.55 | 1.46 | 1.29 | 1.36 | 1.56 | 1.43 | 1.56 | 1.40 |
| | Color tone (color saturation C*) | 43 | 38 | 40 | 35 | 32 | 39 | 37 | 40 | 30 |
| | Gas resistance (OD residual ratio) | 92 | 93 | 92 | 95 | 96 | 95 | 94 | 96 | 97 |

(*2) content of dye/content of pigment
Chemical 1: Exemplified Compound 1
Chemical 2: Exemplified Compound 4

TABLE 6

| | | Comparative Examples | | | | | |
|---|---|---|---|---|---|---|---|
| | | 1 | 2 | 3 | 4 | 5 | 6 |
| Paper | Dye | Chemical 1 | Chemical 2 | Chemical 3 | Chemical 3 | Chemical 4 | Chemical 3 |
| | Ratio (*2) | — | — | — | 13.3 | 13.3 | 5.0 |
| Office Planner | Reflection density (OD) | 0.83 | 0.81 | 0.82 | 0.84 | 0.74 | 0.87 |
| | Color tone (color saturation C*) | 47 | 48 | 47 | 45 | 50 | 43 |
| | Gas resistance (OD residual ratio) | >98 | >98 | >98 | >98 | >98 | >98 |
| PR-101 | Reflection density (OD) | 1.36 | 1.14 | 1.21 | 1.29 | 1.11 | 1.36 |
| | Color tone (color saturation C*) | 48 | 42 | 36 | 34 | 35 | 32 |
| | Gas resistance (OD residual ratio) | 89 | 92 | 60 | 60 | 53 | 62 |

(*2) content of dye/content of pigment
Chemical 1: Exemplified Compound 1
Chemical 2: Exemplified Compound 4
Chemical 3: C.I. Direct Black 195
Chemical 4: C.I. Direct Black 168

TABLE 7

| | | Examples | | Comparative Examples | |
|---|---|---|---|---|---|
| | | 6 | 9 | 4 | 6 |
| Dye | Paper | Chemical 2 | Chemical 2 | Chemical 3 | Chemical 3 |
| Ratio (*2) | | 5.7 | 5.0 | 13.3 | 5.0 |
| OD(100%) (*3) | PR-101 | 2.09 | 2.03 | 2.16 | 1.98 |
| OD(max) (*4) | | 2.09 | 2.07 | 2.16 | 2.10 |
| Metal luster | | Absent | Present a little | Absent | Present |

(*2) content of dye/content of pigment
(*3) OD in an image with an application amount of 100%
(*4) the highest OD in images with an application amount of 0 to 100%
Chemical 2: Exemplified Compound 4
Chemical 3: C.I. Direct Black 195

This present application claims the priority from each of Japanese Patent Application No. 2004-221833 filed on Jul. 29, 2004 and Japanese Patent Application No. 2005-216231 filed on Jul. 26, 2005, which are hereby incorporated by reference herein.

What is claimed is:

1. An ink jet black ink comprising a dye and a black pigment, wherein the dye is at least one kind selected from the group consisting of compounds represented by the following formula (I) or salts thereof, and compounds represented by the following formula (II) or salts thereof;

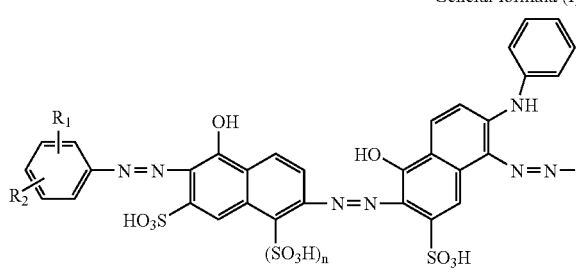

General formula (I)

-continued

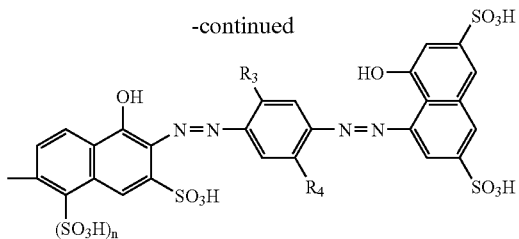

wherein $R_1$ and $R_2$ each independently represent a hydrogen atom, a hydroxyl group, an amino group, a carboxyl group, a sulfonic group, an alkyl group having 1 to 4 carbon atoms or an alkoxy group having 1 to 4 carbon atoms; and $R_3$ and $R_4$ each independently represent a hydrogen atom, an alkyl group having 1 to 4 carbon atoms, an alkoxy group having 1 to 4 carbon atoms, a hydroxyl group, an alkyl group having 1 to 4 carbon atoms which may be substituted with a hydroxyl group or with an alkoxy group having 1 to 4 carbon atoms, an alkoxy group having 1 to 4 carbon atoms and which may be substituted with a hydroxyl group, with an alkoxy group having 1 to 4 carbon atoms, with a sulfonic group, or with a carboxyl group, or an amino group which is substituted with an alkyl group or with an acyl group; and n represents 0 or 1; and General formula (II)

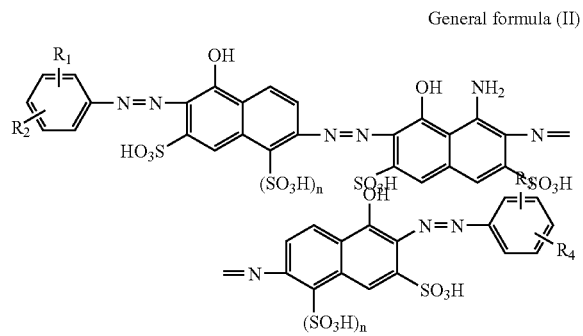

wherein $R_1$, $R_2$, $R_3$, and $R_4$ each independently represent a hydrogen atom, a hydroxyl group, an amino group, a carboxyl group, a sulfonic group, an alkyl group having 1 to 4 carbon atoms, an alkoxy group having 1 to 4 carbon atoms, an alkoxy group substituted with a hydroxyl group, an alkoxy group having 1 to 4 carbon atoms, a sulfonic group or a carboxyl group, an alkoxy group having 1 to 4 carbon atoms and which may be further substituted with a carboxyl group or with a sulfonic group, or an amino group substituted with a phenyl group, with an alkyl group, or with an acyl group; and n represents 0 or 1.

2. The ink jet black ink according to claim 1, wherein the black pigment is a self-dispersion carbon black.

3. The ink jet black ink according to claim 1, wherein a mass ratio of the content of the dye to the content of the pigment satisfies (content of dye/content of pigment)>5.

4. An ink set, comprising a plurality of inks, which comprises the ink jet black ink according to claim 1 as a black ink.

5. An ink jet recording method, comprising ejecting an ink by ink jet method, wherein the ink comprises the ink jet black ink according to claim 1.

6. The ink jet recording method according to claim 5, wherein the recording medium comprises a porous material having a cationic electric charge in a supporting material.

7. An ink cartridge, comprising an ink storage portion for storing an ink, wherein the ink comprises the ink jet black ink according to claim 1.

8. A recording unit, comprising an ink storage portion for storing an ink and a recording head for ejecting the ink, wherein the ink comprises the ink jet black ink according to claim 1.

9. An ink jet recording apparatus, comprising an ink storage portion for storing an ink and a recording head for ejecting the ink, wherein the ink comprises the ink jet black ink according to claim 1.

* * * * *

UNITED STATES PATENT AND TRADEMARK OFFICE
CERTIFICATE OF CORRECTION

PATENT NO. : 7,198,664 B2
APPLICATION NO. : 11/339770
DATED : April 3, 2007
INVENTOR(S) : Kumiko Mafune et al.

It is certified that error appears in the above-identified patent and that said Letters Patent is hereby corrected as shown below:

COLUMN 13

Line 11, "applirable" should read --applicable--.

COLUMN 20

Line 4, "To" should read --To the--.

COLUMN 27

Lines 30-41, the chemical drawing shown beneath "General formula (II)" should be deleted and replaced with the following chemical drawing:

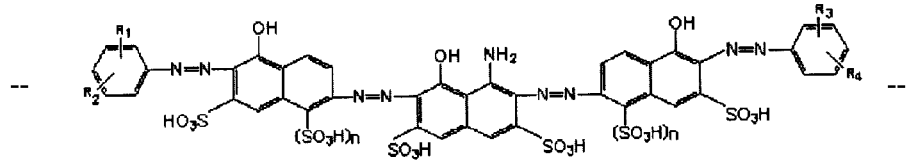

Signed and Sealed this

Twenty-seventh Day of May, 2008

JON W. DUDAS
*Director of the United States Patent and Trademark Office*